Sept. 18, 1962 H. D. MAGUIRE 3,054,461
BANKING ATTACHMENT FOR TRACTORS
Filed Oct. 7, 1958 2 Sheets-Sheet 1
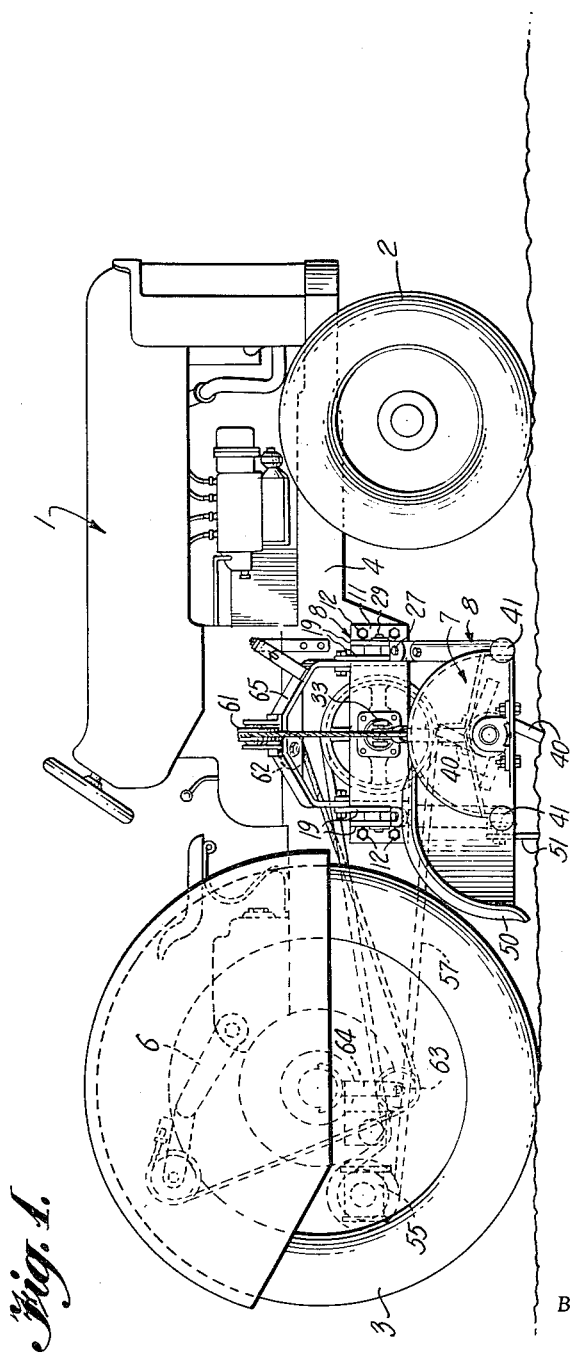
INVENTOR
Harold D. Maguire
BY Mason, Fenwick & Lawrence
ATTORNEYS Sept. 18, 1962
H. D. MAGUIRE
3,054,461
BANKING ATTACHMENT FOR TRACTORS
Filed Oct. 7, 1958
2 Sheets-Sheet 2
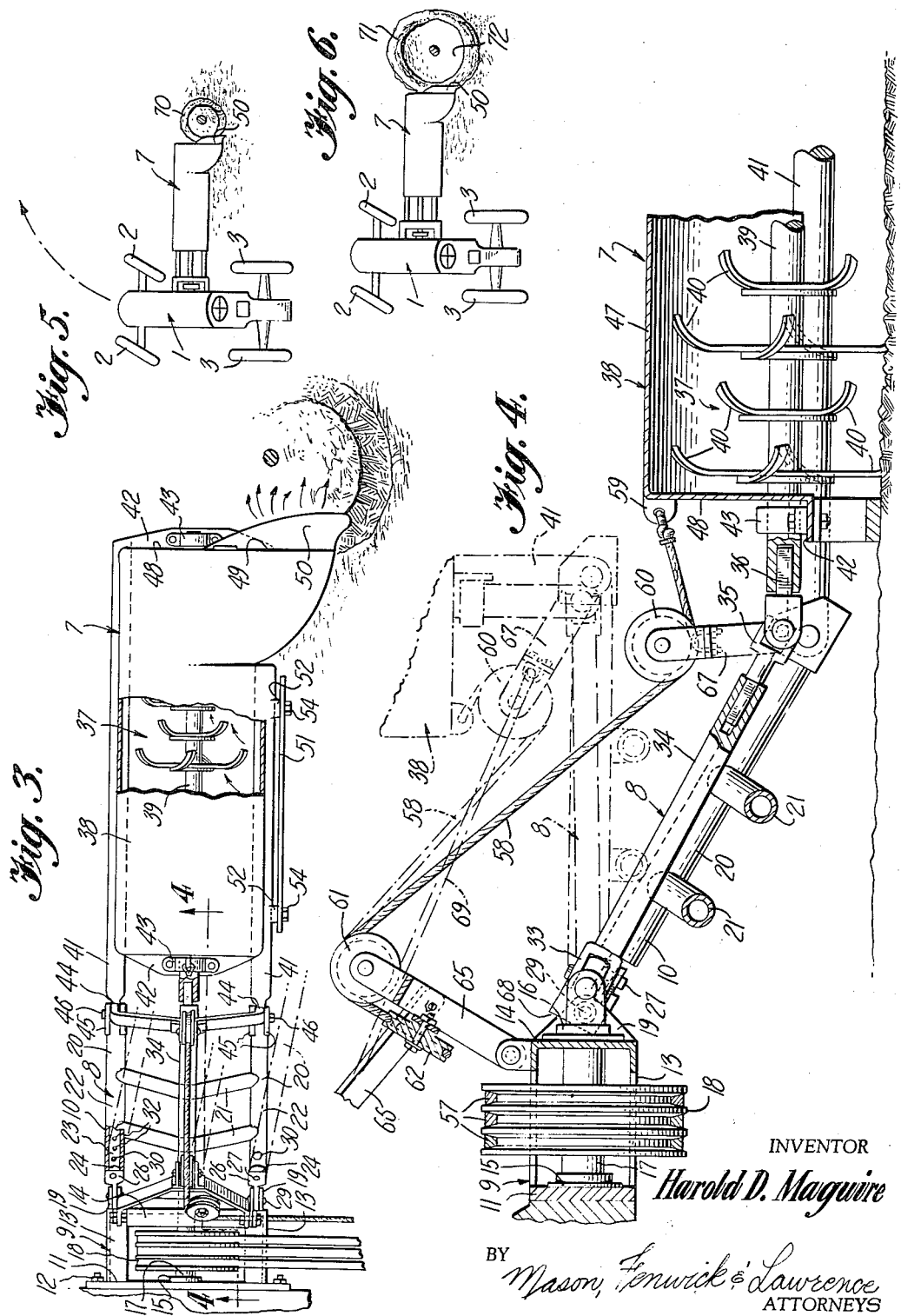
INVENTOR
*Harold D. Maguire*
BY *Mason, Fenwick & Lawrence*
ATTORNEYS

United States Patent Office 3,054,461
Patented Sept. 18, 1962

3,054,461
BANKING ATTACHMENT FOR TRACTORS
Harold D. Maguire, Orlando, Fla.
(2 Bluford Ave., Ocoee, Fla.)
Filed Oct. 7, 1958, Ser. No. 765,813
3 Claims. (Cl. 172—71)

This invention relates to devices for banking or ringing trees, and is particularly adapted to throwing up a protective layer of soil around the base of young trees.

It is the practice in propagating citrus trees to graft bud wood from selected bearing trees onto roots of hardy but inferior bearing stock, such as sour lemon. The grafted wood will form the tree and determine the fruit which the tree bears. If, however, the bud wood is damaged by cold, or other cause, the tree will revert to the inferior stock of the root. It is highly important, therefore, that the bud area of young trees be protected from cold. This is usually done by throwing up a bank of soil around the base of the tree.

The young trees need watering several times after planting in the grove, and this can be accomplished by throwing up a circular dam around the tree and filling the cavity between the tree and dam with water.

Originally, the banking of the young trees was done by having workmen throw ten to fifteen shovels of dirt around the tree, forming a cone of about twelve to fourteen inches high and about eight to twelve inches thick at the base. The soil was not packed, and being cone-shaped had little thickness at the top. Rain could wash it away, and cold seep through. Recently, a banking machine came into use which utilized a high-speed spinning disk to throw soil on a conveyor to be delivered to a tree. This machine, however, digs a hole from one to two feet deep and approximately three feet long in the middle of an aisle between tree rows so that driving and further cultivation in the grove becomes very hazardous.

The object of the present invention is to provide a banking device, or banking attachment for tractors, which will form a mound of soil about the base of a young tree that will hold its form despite the elements and will not require the digging of a hole during the formation of the mound.

A more specific object of the invention is the provision of a specially designed rotary hoe structure for attachment to a tractor, which will move small quantities of soil over a relatively large area around a tree and throw up the moved soil about the tree to form a protective mound.

Another object of the invention is to provide a device of this character which will compact the thrown up mound of earth so that it will not be readily destroyed by erosion.

A further object is the provision of means, in a banking machine, to move loosened earth to a desired area for controlled deposit in a mound about a tree.

Yet another object is to provide means for attachment of a banking attachment to a tractor which will permit raising and lowering of the banking device and horizontal adjustment to change the angle of the device relative to the carrying tractor.

A still further object is the provision of means to mount a device of this kind at a central position to the side of the tractor, and supply the drive from the rear power take off of the tractor without side thrust on the rear power take off.

Another object of the invention is to provide means to level off the area about a tree from which earth is moved to leave the area in good condition after the bank, or mound, is formed.

Other objects of the invention will become apparent from the following description of one practical embodiment thereof when taken in conjunction with the drawings which accompany, and form part of, this specification.

In the drawings:

FIGURE 1 is a side view of a tractor with a banking device incorporating the principles of the present invention attached thereto;

FIGURE 2 is a partial rear view of the equipment shown in FIGURE 1;

FIGURE 3 is a partial top plan view of the structure shown in FIGURE 1;

FIGURE 4 is a fragmentary vertical section, taken on the line 4—4 of FIGURE 3, showing in detail the means for controlling the movement of the hoe;

FIGURE 5 is a diagrammatic plan view showing the equipment in position relative to a tree to throw up a bank around the tree; and FIGURE 6 is a similar view of FIGURE 5 with the banking machine in position to form a circular dam around a tree.

In general, the invention consists in mounting a rotary hoe of special characteristics, which is within a housing of particular arrangement, on the side of a tractor by means which permits the hoe to be placed at selected horizontal angles relative to the tractor. There are means for raising and lowering the hoe, and means for driving the hoe from the rear power take-off of the tractor.

Referring to the drawings in detail, a tractor of standard make is shown at 1, having the usual front and rear wheels 2 and 3, and frame 4. The tractor has the usual rear power take-off 5 and standard lift arms 6. A banking hoe 7 is connected to the tractor at the side by means of a connector frame 8. The connector consists of a mounting bracket 9 and an adjustable mounting frame 10.

The mounting bracket 9 consists of a plate 11, for attachment by bolts 12 to the tractor frame, which plate bridges the open end of a U-frame of channel cross-section. The plate and U-frame are integral, or rigidly united, to form a rectangular boxing. The plate projects on both sides beyond the side arms 13 of the U-frame to provide areas through which the mounting bolts 12 may pass. The plate and the bridge bar 14 of the U-frame carry bearings 15 and 16 to support a drive shaft 17. The shaft carries a pulley 18 which is driven in a manner to be described. At each end of the bridge bar of the U-frame pairs of ears 19 project forwardly to provide attaching means for the mounting frame 10.

Frame 10 consists of a pair of spaced, parallel side members 20 which are held in spaced relation by the bridge members 21. The side members 20 are formed from telescoping tubes with the bridge bars being connected to the outer tubular members 22. Thus, the outer members will be rigidly held in rectilinear arrangement. The inner sliding members 23 have flattened ends 24 for pivotal attachment between ears 25 of clevises 26. The flattened ends 24 and the ears 25 are arranged to provide pivotal movement about the connecting pins 27 in a fore and aft direction relative to the tractor. The clevises 26 have extensions 28 at right angles to the ears 25 to fit between the ears 19 on the mounting bracket and be secured by pivot pins 29 to provide for swinging movement in a vertical direction.

The telescoping side members 20 are held in position of adjustment by means of bolts 30 which pass through openings 31 in the outer tubes 20 and selected ones of openings 32 in the inner members 23. If the bolts 30 are placed in corresponding openings in the inner members of the telescoping side frames, the connecting frame will project at right angle to the tractor frame. If the members are adjusted so that the inner members project from the outer ones unequal lengths, the frame as a whole will extend at other than a right angle from the frame and will be inclined either forwardly or backwardly. This lateral adjustment is permitted because the side members may swing freely about the pivot pins 27 within the range permitted by the tolerances of the various connections and interfitting parts to adapt themselves to the respective arm lengths. In all positions of adjustment, the connecting frame is free to move vertically about the pivot pins 29.

Drive shaft 17 has one element of a universal joint 33 connected to its end, and the other element of the universal joint is connected to a telescopic drive shaft section 34. The other end of the shaft section 34 is connected by universal joint 35 to drive a stub shaft 36, which is for connection to the banking hoe 7, as will be described.

The banking hoe is an attachment which is mountable on the connecting frame 8. It consists of a rotary hoe 37 and a housing 38 which serves to cover the hoe and to control and direct the movement of soil acted upon by the hoe.

The rotary hoe includes a shaft 39 and a plurality of hoes 40. The hoe members are curved in the conventional manner, but the hoes are arranged so that all curve in the same direction, that is away from the tractor, so that the soil disturbed by the hoes will be moved longitudinally of the hoe structure in the direction in which the hoe elements are curved. One end of the shaft 39 is recessed to telescopically receive the stub shaft 36 to couple the hoe to the drive means.

The housing 38 is mounted upon a frame consisting of a pair of spaced, parallel side members 41 which are tied together by cross-braces 42. The cross-members support bearings 43 to mount the hoe shaft 38. Side members 41 are flattened at one end to provide attaching ears 44 for connection between the bifurcated ends 45 of the outer tubular members 22 of the connector frame 8. The hoe and connecting frame are releasably joined by pivot pins 46 which pass through openings in the ears 44 and ends 45. The hoe is covered by the housing 38 which takes the form of a hood 47 of substantially semi-cylindrical form which is suitably secured to the side members 41. The ends of the hood are closed by the end sections 48. Near the outer free end of the hoe, the hood is bulged outwardly to form a curved delivery spout 49 through which earth is thrown and directed for the formation of a bank, as will be described. The outlet end of the spout has its edge framed by a lip 50 which serves to compact and shape the earth which is thrown out of the spout and mounded up to form the bank. The lip is shown as a flange which extends around the upper and back edges of the spout outlet opening.

Along the back edge of the housing, from the inner edge to the outlet spout, there is a scraper, or leveler, blade 51 which is adapted to pass over the loosened dirt and level it as the bank is formed. The blade is attached to bosses 52, and a vertical series of openings 53 are provided for bolts 54 to permit vertical adjustment of the blade.

The driving connection from pulley 18 through the telescopic and universally connected shafts has been described. Pulley 18 is driven from the rear power take-off 5 of the tractor. The take-off is not designed to take side thrust, and the bearings will soon wear out if side thrust is imposed. Therefore, in order to change the direction of the drive and to bring the power out to the side of the tractor in line with pulley 18, a standard fitting 55, which includes direction changing gears and a shaft to which a pulley 56 is attached, is connected to the take-off. The two pulleys are connected by belt 57. This arrangement provides a straight drive to pulley 18, relieves the power take-off of any side thrust and, at the same time, permits a side mounting for the hoe.

It will be obvious that due to the pivotal mounting of the connector frame 8 to the tractor and the banking hoe to the connector frame, the banking hoe will be completely free to raise and lower and tilt in a vertical plane to follow closely the contour of the ground over which it is moved. It is desirable, however, to provide means for lifting the hoe for movement from place to place.

The hoe is lifted for transportation by means of a cable 58 which is connected to an ear 59 on the hoe and to the conventional tractor lift arm 6. The hoe is at the side of the tractor and the lift arm, of course, is at the back. To make the direction changes necessary and to acquire the desired leverage, the cable is trained over pulleys 60, 61, 62 and 63. Pulley 63 is mounted on a bracket 64 at the rear of the tractor and causes the cable extending downwardly from the lift arm to be turned to project forwardly. Pulleys 61 and 62 are carried by a bridge member 65 which spans the mounting bracket 9. The bridge member is held rigidly in position by a brace 66 connected to the bridge and the tractor. Pulleys 61 and 62 are positioned at right angles to one another to provide for smooth direction change from the forwardly extending length of cable to project to the side. Pulley 60 is intermediate pulley 61 and the attachment of the cable to the hoe. Pulley 60 is carried by a swingable bail 67 and forms a shifting fulcrum for the line.

When lift arm 6 is operated, the pull on the cable will first cause the entire hoe and connector frame structure to lift. This will raise the connector to a horizontal position, in which position it will be stopped by reason of projections 68 on the ends of tubular members 22 striking the mounting bracket 9. Continued pull on the cable will cause the hoe to swing about the pivot pins 46 to assure a vertical position. When in raised position, a tie rod 69 may be connected between the bail 67 and the brace member 66 to take the weight of the device off of the cable.

In using the device, the tractor is run to a grove and will be positioned adjacent a tree. The hoe will be lowered and the angle of the hoe relative to the tractor fixed. The hoe will be positioned so that the delivery spout is adjacent, but spaced from the tree to be banked. The tractor is then moved around the tree while the hoe is being actuated. The soil in the circular area traversed by the hoe will be loosened and moved outwardly of the device to the spout. The amount of earth held within the hoe housing and moved outwardly by the hoe will be determined by the setting of the leveling blade 51. The dirt delivered to the spout will be poured out around the tree to form a mound. The mound will be generally frusto-conical in shape, as shown in FIGURE 2 at 70. As the mound is built up, the compacting lip 50 will smooth and shape the bank as well as firm the earth to a compact pile. This will form a very efficient protection for the tree and, at the same time, leave the earth around the tree smooth and free from holes which might form a hazard for men or vehicles working in the area. When the tractor has completely encircled the tree, the hoe will be lifted and the tractor moved to the next tree to be banked. During the banking operation, the hoe is at the side where it is in full view of the operator at all times. At the same time, it is forward of the rear wheels of the tractor so that it moves toward and from the tree being banked in accordance with the movement of the tractor front wheels.

There are times when it is necessary to water young trees, and the present device can be used to advantage to build a dam or dyke about the tree to hold a supply of water. To do this, the device is operated in the same manner as before but is spaced further from the tree. This results in the earth being deposited in a ring 71 about the tree leaving a basin 72 that can hold water.

While in the above one practical embodiment of the invention has been disclosed it will be understood that the specific details of structure shown and described are merely by way of illustration and the invention may take other forms within the scope of the appended claims.

What is claimed is:

1. A banking head adapted for attachment to the side of a tractor comprising, a frame, a shaft extending generally transversely to the path of travel rotatably mounted on the frame, a plurality of hoe elements carried by the shaft shaped and arranged to loosen earth over which the banking head is moved and to move the loosened earth in one direction longitudinally of the shaft, means on the frame at the frame end opposite that end of the frame toward which earth is moved for pivotally attaching the frame to a tractor so that the frame may swing vertically, a hood open across its entire bottom carried by the frame and housing the upper part of the rotary hoe, the hood having closed ends and a back wall with a bottom trailing edge substantially parallel to the shaft and terminating close to the earth over which the banking head is moved, whereby loosened earth above a predetermined depth will be prevented from escaping under the hood edge as the head travels along, the hood bulging outwardly adjacent the closed end toward which loosened earth is moved to form a delivery spout portion rearwardly inclining from the back wall of the hood and having an outlet opening through the adjacent hood end, and means forming part of the hood and framing the top and rear of the outlet to conform earth flow from the outlet to a stream of selected shape to form it into a bank of predetermined cross sectional contour.

2. A banking attachment as claimed in claim 1 wherein the earth directing and contouring means framing the top and rear of the outlet includes a lip projecting generally in the direction of earth flow through the outlet to smooth and compact earth emerging from the outlet.

3. A banking attachment as claimed in claim 2 wherein the bottom trailing edge of the hood back wall is formed by a leveler plate extending the length of the hood and connected to the hood back wall for adjustment vertically, whereby the trailing edge of the hood back wall can be raised and lowered.

References Cited in the file of this patent
UNITED STATES PATENTS

| | | |
|---|---|---|
| 95,651 | Cage | Oct. 12, 1869 |
| 361,866 | Erwin | Apr. 26, 1887 |
| 841,848 | Conner | Jan. 22, 1907 |
| 1,662,088 | Von Raussendorff | Mar. 13, 1928 |
| 1,910,120 | Mowbray | May 23, 1933 |
| 2,173,771 | Taylor | Sept. 19, 1939 |
| 2,291,987 | Rogers | Aug. 4, 1942 |
| 2,521,549 | Smith | Sept. 5, 1950 |
| 2,551,861 | Witte | May 8, 1951 |
| 2,552,710 | Dodson | May 15, 1951 |
| 2,554,498 | Patterson | May 29, 1951 |
| 2,658,290 | Pierce | Nov. 10, 1953 |
| 2,694,969 | Chattin | Nov. 23, 1954 |
| 2,748,679 | Rogers | June 5, 1956 |
| 2,767,632 | Whittington | Oct. 23, 1956 |
| 2,788,729 | Hill | Apr. 16, 1957 |